J. E. BRIDGES.
MEAT TENDERER.
APPLICATION FILED MAR. 11, 1921.
1,400,413.
Patented Dec. 13, 1921.
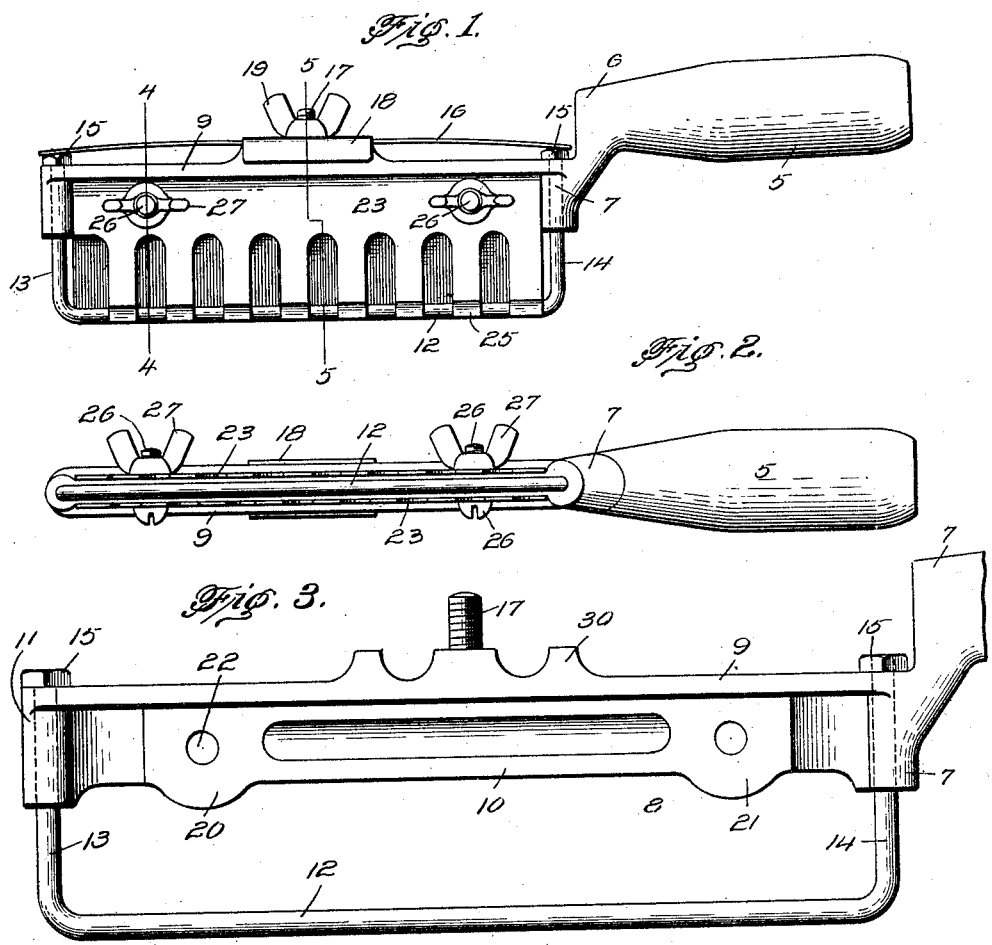
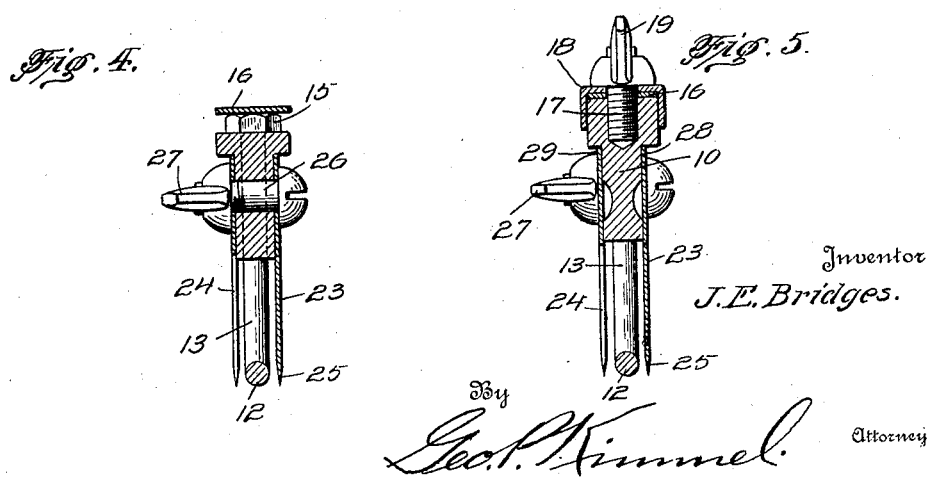
Inventor
J. E. Bridges.
By Geo. P. Kimmel
Attorney

UNITED STATES PATENT OFFICE.

JOSEPH E. BRIDGES, OF INDEPENDENCE, MISSOURI.

MEAT-TENDERER.

1,400,413.  Specification of Letters Patent.  Patented Dec. 13, 1921.

Application filed March 11, 1921. Serial No. 451,546.

*To all whom it may concern:*

Be it known that I, JOSEPH E. BRIDGES, a citizen of the United States, residing at Independence, in the county of Jackson and State of Missouri, have invented certain new and useful Improvements in Meat-Tenderers, of which the following is a specification.

This invention relates to improvements in meat tenderers and more particularly to that type of devices used by butchers for instance for chopping and cutting meat.

One of the objects of the invention is directed to a novel and improved form of meat chopper or meat tenderer wherein the cutting knives thereof are mounted with respect to a frame and a resilient cleaner bar constructed and arranged so as to clear the teeth of the knives during their operation.

A still further object of the invention resides in the construction of a meat tenderer or chopper wherein a pair of similar, removable knives are supported in a frame and on each side of a resilient, substantially U-shaped cleaner bar which is devoid of resilient coiled springs such as now commonly employed in devices similar to that forming the subject matter of this application.

Another and equally important object of the invention resides in the construction of a meat tenderer which can easily be assembled and taken apart for the purposes of cleaning the knives and the cleaner bar and one in which the knives may be secured to the frame of the device in staggered or parallel relation with each other including provision for loosening and tightening the cleaner bar and limiting its vertical movement with respect to the teeth of the knives.

The final object of the invention resides in the provision of a meat tenderer which will be extremely simple in construction, consisting of comparatively few parts therefor inexpensive to manufacture, highly efficient and positive in operation and use, durable and rigid in construction, capable of being easily assembled and disassembled and otherwise meeting the requirement of construction of this type whereby its commercial possibilities are enhanced.

With these objects in view and others which will be manifest and suggested as the purpose and nature of my invention are revealed in the following specification and drawing wherein I have shown but one embodiment thereof, Figure 1 is a perspective view showing the invention assembled.

Fig. 2 is a bottom view showing the relation of the teeth of the cutting knives to the cleaner bar.

Fig. 3 is an enlarged view of the frame with the knives removed.

Fig. 4 is a sectional view taken on the line 4—4 of Fig. 1.

Fig. 5 is another sectional view taken on the line 5—5 of Fig. 1.

Referring now to the drawings wherein like parts designate corresponding parts throughout the specification, 5 designates the handle of the device which is shown tapered as at 6 terminating in a downward extension 7 which is preferably apertured to receive one end of a cleaner bar subsequently to be referred to. The said downward extension 7 is formed integral with a body or frame designated in its entirety by numeral 8 and consists of a top widened head 9 and a reduced depending portion 10. The opposite end of the head 9 terminates in a bearing portion 11 which as shown receives the opposite end of a U-shaped cleaner bar 12, the leg portions 13, 14 of which extend through the apertures in the ends of the head and are retained by suitable fastening elements 15 as clearly shown in Fig. 3 of the drawing.

It is, of course, understood that the U-shaped bar 12 may freely move upwardly and downwardly with respect to the body 9, being restricted in its movement by a flat spring 16 which is adapted to normally overlie a screw threaded stud 17 and retained thereon by a flat, retaining element 18 and a thumb screw 19 as clearly shown in Fig. 1 of the drawing.

The ears 20, 21 formed from the body of the frame are apertured as at 22 for alinement with similar apertures in the opposite cutting knives 23, 24, the teeth 25 of which are arranged in staggered relation with each other, the respective knives being secured to the ears 20, 21 of the body portion of the frame by screw bolts and thumb nuts, 26, 27 in the manner shown.

Referring to Figs. 4 and 5, it will be seen that the respective knives are in abutting relation with the enlarged head as shown at 28, 29 which prevent the movement of said knives with respect to said frame. The raised extension 30 centrally of the head 9 of the frame is so positioned that the flat spring 16 will be positioned and gradually curved toward its ends which of course are adapted to normally contact with the securing elements 15 on the leg portions of the cleaner bar. It will of course be readily understood that the screw bolts and thumb nuts may easily be removed to permit the knives to be cleaned or the teeth thereof sharpened without in any way effecting or necessitating the removal of the bar and similarly the spring may be removed or replaced without rearranging or moving the knives. Since the device is totally devoid of coiled springs, the advantages of the present construction over similar devices now on the market will be quite apparent and since a clearer and more extended description is not necessary in view of the clear drawing forming a part of this application and since the use and function of the same is clearly understood, further explanation is deemed unnecessary.

However, in the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. In a meat tenderer, the combination with a knife body having an enlarged head portion and a handle, of removable knives having apertures therein for securing the said knives to the faces of the knife body in either parallel or staggered relation with respect to each other, bearings formed in the head portion of the knife body, a U-shaped cleaner bar between the knives and supported for vertical movement in said bearings, and an adjustable, flat spring removed from the cutting edges of the knives, said spring being secured to and overlying the top of the body and bearing against the ends of the cleaner bar.

2. In a meat tenderer, the combination with a knife body having an enlarged head portion and a handle, of removable knives having apertures therein bearing against the head portion and adapted to be secured to the opposite faces of the knife body, bearings formed in the ends of the knife body, a U-shaped cleaner bar between the knives and supported for vertical movement with respect thereto, a raised extension intermediate of the head of said body, and an adjustable flat spring removed from the cutting edges of the knives, said spring being secured to and overlying the raised extension and the ends of the cleaner bar.

3. In a meat tenderer, the combination with a knife body having an enlarged head portion and a handle, of removable knives having apertures therein bearing against the head portion, said body being provided with apertured ears for securing the knives to the opposite faces of the knife body, bearings formed in the ends of the knife body, a U-shaped cleaner bar between the bars supported for vertical movement with respect thereto, a raised extension intermediate the ends of the head of said body, a threaded stud carried by said extension, a flat spring engaging said stud and overlying the raised extension and the upper terminals of the cleaner bar, a flat retaining element carried by the stud preventing lateral movement of the spring and a thumb nut for adjustably securing said retaining element and spring in their normal position on the top of the knife body.

4. In a meat tenderer, the combination with a knife body having an enlarged head portion and a handle, of removable knives having apertures therein for securing the said knives to the faces of the knife body, a cleaner bar positioned between the knives and supported in the ends of the body, and an adjustable flat spring removed from the cutting edges of the knives, said spring being secured to and overlying the top of the body bearing against the ends of the cleaner bar.

In testimony whereof, I affix my signature hereto.

JOSEPH E. BRIDGES.